United States Patent
Chan et al.

(10) Patent No.: US 6,804,075 B1
(45) Date of Patent: Oct. 12, 2004

(54) LOGICAL EXPIRATION OF MEDIA HAVING EMBEDDED NON-VOLATILE MEMORY

(75) Inventors: Nathan Chan, Sunnyvale, CA (US); Paresh J. Desai, San Jose, CA (US); Shinichiro Ken Torii, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 343 days.

(21) Appl. No.: 10/090,313

(22) Filed: Mar. 1, 2002

(51) Int. Cl.[7] .............................................. G11B 15/04
(52) U.S. Cl. ......................................... 360/60; 360/69
(58) Field of Search ................................ 711/162, 159, 711/160, 161, 163, 167, 111, 112; 707/204; 714/6; 360/60, 66, 57, 48, 31, 55, 69, 132, 134

(56) References Cited

U.S. PATENT DOCUMENTS

| | | |
|---|---|---|
| 4,682,292 A | 7/1987 | Bue et al. |
| 5,084,787 A | 1/1992 | Hunter et al. |
| 5,163,136 A | 11/1992 | Richmond |
| 5,377,056 A | 12/1994 | Jones |
| 5,384,669 A | 1/1995 | Dunn et al. |
| 5,448,427 A | 9/1995 | Masuda et al. |
| 5,546,246 A | 8/1996 | Klomp et al. |
| 5,608,585 A | 3/1997 | Masuda et al. |
| 5,638,229 A | 6/1997 | Shingu et al. |
| 5,671,350 A | 9/1997 | Wood |
| 5,710,676 A | 1/1998 | Fry et al. |
| 5,757,571 A | 5/1998 | Basham et al. |
| 5,758,151 A | 5/1998 | Milligan et al. |
| 5,818,652 A | 10/1998 | Ozaki et al. |
| 5,923,486 A * | 7/1999 | Sugiyama et al. ............ 360/60 |
| 6,023,388 A | 2/2000 | Ikeda et al. |
| 6,029,229 A | 2/2000 | Vishlitzky |
| 6,093,925 A | 7/2000 | Maeda et al. |
| 6,134,066 A | 10/2000 | Takayama et al. |
| 6,182,191 B1 | 1/2001 | Fukuzono et al. |
| 6,288,862 B1 * | 9/2001 | Baron et al. ................... 360/55 |
| 6,301,067 B1 * | 10/2001 | Takayama ..................... 360/48 |
| 6,307,700 B1 * | 10/2001 | Takayama .................. 360/72.2 |
| 6,366,987 B1 | 4/2002 | Tzelnic et al. |
| 6,417,978 B1 | 7/2002 | Enomoto |
| 6,501,612 B1 | 12/2002 | Kato et al. |
| 6,535,344 B1 | 3/2003 | Takayama |
| 6,580,576 B1 | 6/2003 | Takayama |
| 6,587,298 B1 * | 7/2003 | Yamada ..................... 360/72.1 |
| 6,603,624 B1 | 8/2003 | Takayama |
| 6,618,795 B2 | 9/2003 | Chan et al. |

OTHER PUBLICATIONS

Rosenblum et al., "The Design and Implementation of a Log–Structured File System:, ACM Transactions on Computer Systems", vol. 10, No. 1, Feb. 1992, pp. 26–52.

* cited by examiner

Primary Examiner—Alan T. Faber
(74) Attorney, Agent, or Firm—Blakely, Sokoloff, Taylor & Zafman LLP

(57) ABSTRACT

An expiration configuration is encoded into non-volatile memory embedded in media, such as a tape cartridge. The encoded expiration configuration specifies if the media is expired and the action to perform if the media is expired. The action may be performed by an application that reads the encoded expiration configuration or by a media device hosting the media. An expiration data for the media may be stored in the encoded expiration configuration or in an external data record.

26 Claims, 4 Drawing Sheets

LOGICAL EXPIRATION OF MEDIA HAVING EMBEDDED NON-VOLATILE MEMORY

FIELD OF THE INVENTION

This invention relates generally to media having embedded non-volatile memory, and more particularly to logically expiring such media.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2000–2002, Sony Electronics, Inc., All Rights Reserved.

BACKGROUND OF THE INVENTION

Magnetic tapes are sequential storage media capable of efficiently and reliably storing large amounts of data. Because of their large storage capacity and relatively low cost, magnetic tapes are commonly used for data backup. A backup server in a network can utilize one or more magnetic tape drives to automatically backup files stored on user computers connected to the network. Magnetic tapes are also used for storage management, multimedia storage and retrieval, real-time data acquisition, and transporting large amounts of data. However, access times to data residing on magnetic tapes are relatively slow compared with other mass storage devices such as hard disks.

One approach to increase the speed of data access on tapes incorporates a non-volatile memory 114 into a magnetic tape cartridge 100 as illustrated in FIG. 1. The non-volatile memory 14, often referred to as "memory-in-cassette" (MIC) or auxiliary memory (AM), may be any non-volatile memory device, such as Erasable Programmable Read-Only Memory (EPROM), Electrically-Erasable Programmable Read-Only Memory (EEPROM), or flash memory. Non-volatile memory 114 may be used to store various types of information about magnetic tape cartridge 100 and magnetic tape 106. Magnetic tape cartridge 100 also contains an interface 116 to facilitate communication between non-volatile memory 114 and a suitably-configured magnetic tape drive (not shown). The configuration of interface 116 includes terminal pins 118, 120, 122, 124, and 126. Other interface configurations may have more or less than five terminal pins. Still other configurations use wireless technology instead of the physical contact provided by the terminal pins.

System log information may be stored in the non-volatile memory 114, enabling a tape drive to quickly locate and access a data file stored in a particular partition along the magnetic tape. The non-volatile memory 114 also may store other information pertinent to the data on the tape.

Data on media, in particular backup tapes, must be erased or otherwise destroyed after a period of time to comply with logistical and/or legal requirements of an organization. The organization typically maintains media logs to determine when the data on the media should be purged. However, if the date information is entered incorrectly, or not entered at all, the corresponding media may not be erased as required. While the logs may be automated through media expiration schemes created by various application software, such schemes are frequently incompatible among applications. Therefore, one application may be used to circumvent the expiration scheme of another application.

SUMMARY OF THE INVENTION

An expiration configuration is encoded into non-volatile memory embedded in media, such as a tape cartridge. The encoded expiration configuration specifies if the media is expired and the action to perform if the media is expired. The action may be performed by an application that reads the encoded expiration configuration or by a media device hosting the media. An expiration data for the media may be stored in the encoded expiration configuration or in an external data record.

The present invention describes systems, apparatus, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
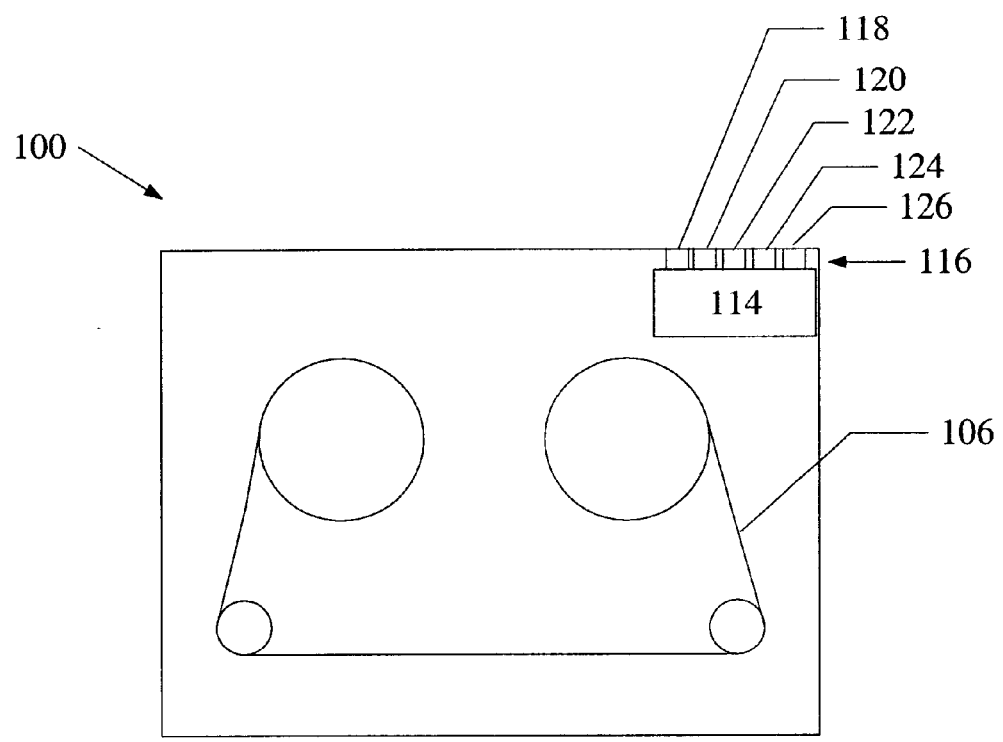
FIG. 1 is a diagram illustrating a prior art tape cartridge containing a non-volatile memory.
Figure 2A:
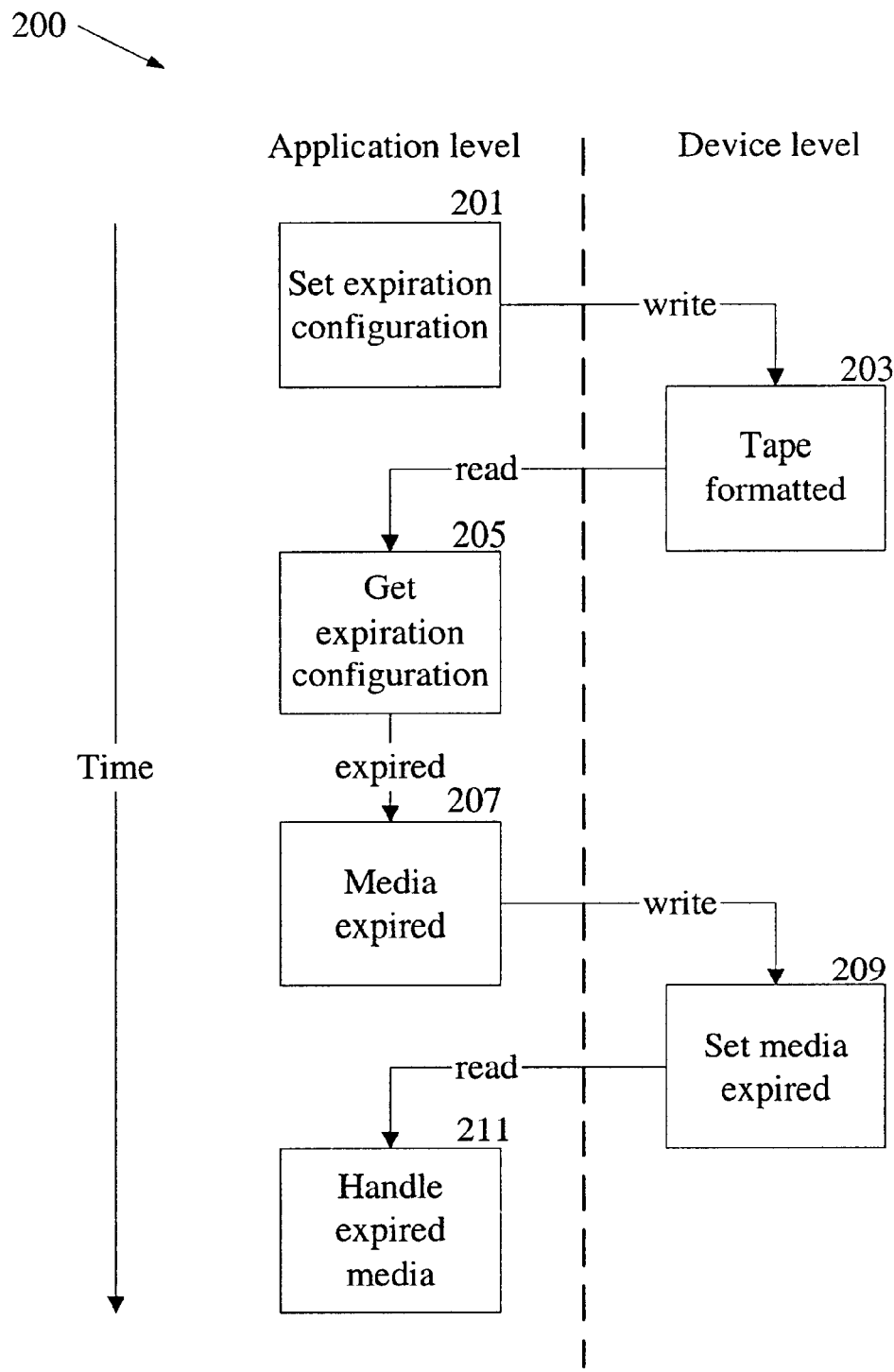
FIG. 2A is a diagram illustrating a overview of the operation of an embodiment of the invention.

Beginning with an overview of the operation of the invention, FIG. 2A illustrates one embodiment of the interactions between an application and a media device when reading and writing to media having an embedded non-volatile memory. While it will be appreciated that various types of media may be embedded with non-volatile memory, a MIC tape cartridge and compatible tape drive are used as exemplary embodiments in describing the invention. Thus, the following description is intended to all types of media, including removable and fixed media, and media devices, including those using SCSI, IDE, EIDE, and other device interfaces, and the invention is not limited to a single type of media or media device.

When the application initializes a new tape, it determines an appropriate expiration configuration for the tape (block 201). The expiration configuration specifies the expiration date of the tape and the action that is taken subsequent to the expiration date. The expiration date may be relative to the initialization date or an absolute date. The action may specify that the tape is erased, locked against read or write commands, ejected immediately upon loading, or any other action that prevents access to the data on the tape. The expiration configuration may be based on user input or on default settings within the application. Portions of the expiration configuration may be encoded in the non-volatile memory when the tape is formatted (block 203) or default values for the expiration configuration may be stored when the tape is manufactured. The application may store the expiration configuration, or portions of it, in a data record keyed on a unique identifier for the tape, such as the tape serial number, which is stored in the non-volatile memory.

When the tape is loaded by the application, the encoded expiration configuration is read from the non-volatile memory (blocks 205 and 211). If the expiration time for the tape has passed (block 207), the encoded expiration configuration is modified to indicate the media has expired (block 209). If the tape is loaded after it has expired, the application performs the action specified by the expiration configuration (block 211).

In one embodiment, the expiration configuration is encoded in the non-volatile memory as two fields, an expired media field and an erase action field, at blocks 203 and 209. The expired media field is initially set to a value that indicates the expiration date has not yet passed. The erase action field indicates the action to be taken when the expired media field indicates the expiration date has passed. The application changes the value of the expired media field when the expiration time in the corresponding data record has passed at block 209. The appropriate value for the erase action field may be stored when the tape is formatted at block 203 or when the expired media field is changed at block 209. In this embodiment, the expiration date is maintained by the application in the data record and the fields may be represented as single bits within the non-volatile memory.

To allow a different application to expire the media, an alternate embodiment stores the expiration date for the tape in the non-volatile memory when the tape is formatted at block 203. The expiration date may be an absolute date or relative to the format date if the format date is stored in the non-volatile memory. The erase action field also may be stored when the tape is formatted at block 203, or a default action value may be stored when the tape is manufactured. It will be appreciated that the expiration date may be stored in the expired media field or may be a separate field in the encoded expiration configuration.

Figure 2B:
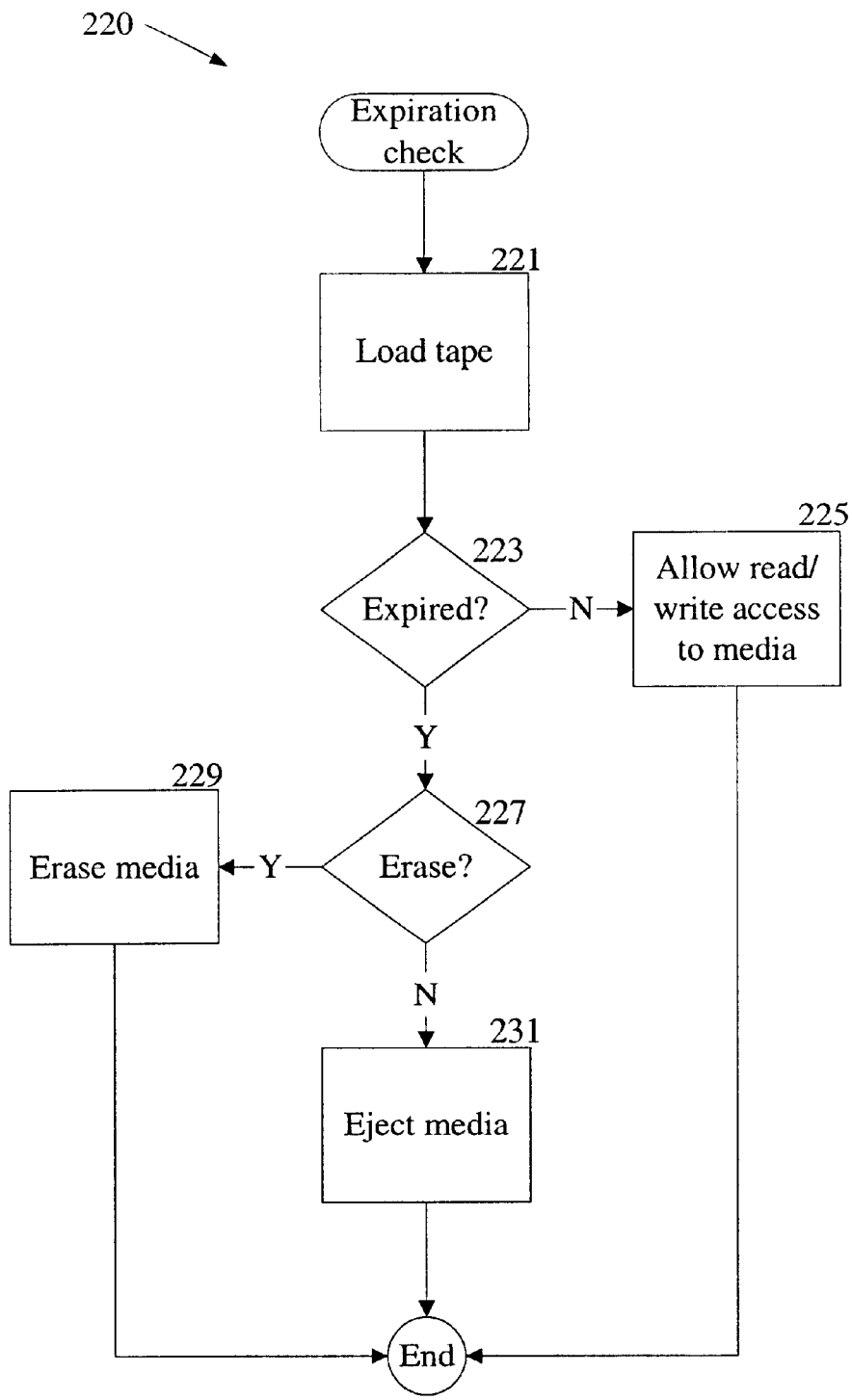
FIG. 2B is a flow diagram of a method to be performed by a media device controller according to an embodiment of the invention.

In yet another embodiment illustrated in FIG. 2B, a controller in the tape drive executes an expiration check method 220 when the drive is reset to prevent access to the tape once the tape has expired. A tape is loaded and the non-volatile memory is read (block 221). If the media is not expired (block 223), the drive allows normal read and write access to the tape (block 225). If the media is expired, the method 220 determines if the action field specifies the tape is to be erased (block 227). If so, the tape is erased at block 229; otherwise the drive ejects the tape without reading the data at block 231. In an alternative embodiment, the method 220 skips the testing at block 227 and immediately ejects the tape at block 231. Thus, no application processing is necessary to prevent access to the data once the tape has expired.

In one embodiment, the processing at block 223 checks the expired media field in the non-volatile memory to determine if the media has expired. In an alternate embodiment in which the controller has access to the current time and date, the processing at block 223 checks the current time and date against an expiration date stored in the non-volatile to determine if the media has expired. In still another embodiment, if the media has expired at block 223, the controller also sets the expired media field before continuing on to the processing represented by block 227.

It will be appreciated that the invention may be implemented using any combination of the embodiments described above.

Figure 2C:
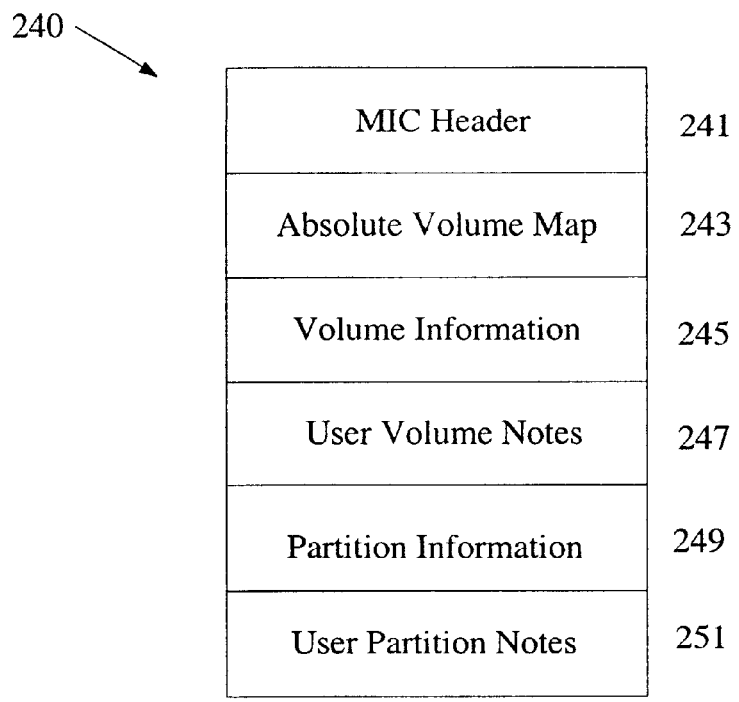
FIG. 2C is an exemplary data structure for embedded non-volatile memory according to the invention.

An exemplary data structure for the non-volatile memory is illustrated in FIG. 2C. A MIC header 241, absolute volume map 243, volume information 245, and partition information 249 are used by the manufacturer of the tape and by the tape drive. The expiration configuration created by the application may be encoded in either user volume notes 247 or user partition notes 251, or a combination of the two.

Figure 3:
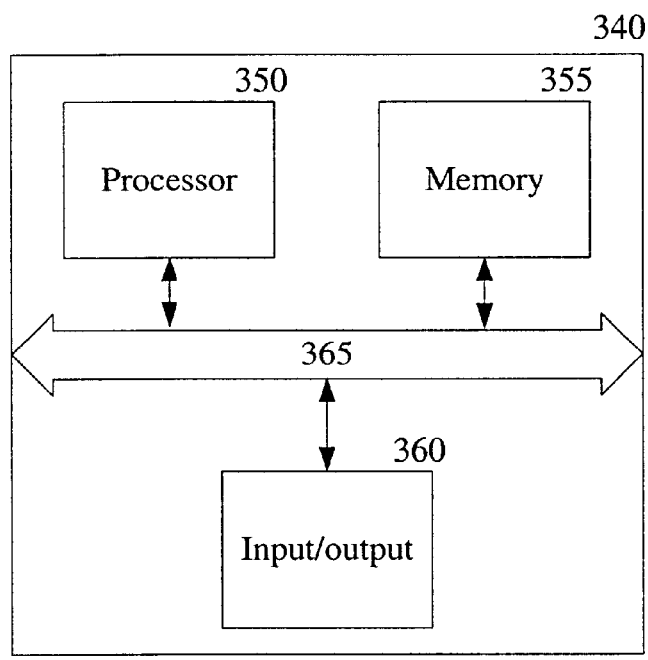
FIG. 3 is a diagram of a computer environment suitable for practicing the invention.

One embodiment of a computer system suitable for use with the present invention is illustrated in FIG. 3. The computer system 340, includes a processor 350, memory 355 and input/output capability 360 coupled to a system bus 365. The memory 355 is configured to store instructions which, when executed by the processor 350, perform the methods described herein. The memory 355 may also store data for subsequent transfer to input/output 360. Input/output 360 encompasses various types of computer-readable media, such as media with embedded non-volatile memory, and includes any type of storage device that is accessible by the processor 350. One of skill in the art will immediately recognize that the term "computer-readable medium/media" further encompasses a carrier wave that encodes a data signal. Input/output 360 also provides for the delivery and display of information to a user of the system 340. It will also be appreciated that the system 340 is controlled by operating system software executing in memory 355. Input/output and related media 360 store the computer-executable instructions for the operating system and methods of the present invention.

The description of FIG. 3 is intended to provide an overview of computer hardware and other operating components suitable for implementing the invention, but is not intended to limit the applicable environments. It will be appreciated that the computer system 340 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that the encoded expiration configuration and the stored expiration configuration may not have the same arrangement of fields.

Furthermore, those of ordinary skill within the art will appreciate that more or fewer processes may be incorporated into the operations illustrated in FIGS. 2A–B without departing from the scope of the invention and that no particular order is implied by the arrangement of blocks shown and described herein. It further will be appreciated that the operations described in conjunction with FIGS. 2A–B may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. If written in a programming language conforming to a recognized standard, the instructions can be executed on a variety of hardware platforms and interface with a variety of operating systems. In addition, the present invention is not described with reference to any particular programming language. It will be appreciated that a variety of programming languages may be used to implement the teachings of the invention as described herein. The instructions may be provided as a computer program product that may include a machine-readable medium having the instructions stored thereon. For the purposes of this specification, the term "machine-readable medium" shall be taken to include any medium that is capable of storing or encoding a sequence of instructions for execution by a machine and that cause the machine to perform any one of the embodiments of the present invention. The term "machine-readable medium" shall accordingly be taken to included, but not be limited to, solid-state memories, optical and magnetic disks, and carrier wave signals. Furthermore, it is common in the art to speak of instructions, in one form or another (e.g., program, procedure, process, application, module, logic . . . ), as taking an action or causing a result. Such expressions are merely a shorthand way of saying that execution of the instructions by a machine causes the processor of the machine to perform an action or a produce a result.

The terminology used in this application with respect to machines and computers is meant to include all computing environments. Therefore, it is manifestly intended that this invention be limited only by the following claims and equivalents thereof.

What is claimed is:

1. A computerized method for logically expiring media having an embedded non-volatile memory comprising:
    encoding an expiration configuration in the embedded non-volatile memory, the expiration configuration specifying if the media is expired and an action to perform if the media is expired.

2. The computerized method of claim 1 further comprising:
    determining the expiration configuration.

3. The computerized method of claim 1 further comprising:
    determining if the media has expired based on the encoded expiration configuration; and
    performing the action if the media has expired.

4. The computerized method of claim 3, wherein determining if the media has expired comprises:
    comparing an expiration date for the media with a current date.

5. The computerized method of claim 4, wherein the expiration date is stored in an external expiration configuration.

6. The computerized method of claim 4, wherein the expiration date is stored in the encoded expiration configuration.

7. The computerized method of claim 1, wherein the action is selected from the group consisting of erasing the media, locking the media against access, and ejecting the media.

8. The computerized method of claim 1, wherein the expiration configuration is encoded when the media is formatted.

9. The computerized method of claim 1, wherein the expiration configuration is encoded when the media expires.

10. The computerized method of claim 1 further comprising:
    modifying the encoded expiration configuration when the media expires.

11. A machine-readable medium having executable instructions to a cause a machine to perform a method comprising:
    encoding an expiration configuration in a non-volatile memory, the expiration configuration specifying if a media is expired and an action to perform if the media is expired.

12. The machine-readable medium of claim 11, wherein the method further comprises:
    determining the expiration configuration.

13. The machine-readable medium of claim 11, wherein the method further comprises:
    determining if the media has expired based on the encoded expiration configuration; and
    performing the action if the media has expired.

14. The machine-readable medium of claim 13, wherein determining if the media has expired comprises:
    comparing an expiration date for the media with a current date.

15. The machine-readable medium of claim 14, wherein the expiration date is stored in an external expiration configuration.

16. The machine-readable medium of claim 14, wherein the expiration date is stored in the expiration configuration.

17. The machine-readable medium of claim 11, wherein the action is selected from the group consisting of erasing the media, locking the media against access, and ejecting the media.

18. The machine-readable medium of claim 11, wherein the expiration configuration is encoded when the media is formatted.

19. The machine-readable medium of claim 11, wherein the expiration configuration is encoded when the media expires.

20. The machine-readable medium of claim 11, wherein the method further comprises:
    modifying the encoded expiration configuration when the media expires.

21. An apparatus comprising:
    a media device coupled to a controller; and
    a process executed by the controller to cause the media device to read an encoded expiration configuration from a non-volatile memory embedded in a loaded media and to perform an action specified in the encoded expiration configuration if the encoded expiration configuration indicates the media is expired.

22. The apparatus of claim 21, wherein the action is selected from the group consisting of erasing the media and ejecting the media.

23. A system comprising:

a processor coupled to a memory through a bus;

a media device coupled to the processor through the bus and compatible with media having an embedded non-volatile memory; and an application process executed by the processor from the memory to cause the processor to encode an expiration configuration that specifies if the media is expired and an action to perform if the media is expired, and to command the media device to store the encoded expiration configuration in the embedded non-volatile memory.

24. The system of claim 23, wherein the application process further causes the processor to command the media device read the encoded expiration configuration, to determine if the media has expired based on the encoded expiration configuration, and to command the media device perform the action if the media has expired.

25. The system of claim 23, wherein the media device further comprises a controller executing a process to cause the media device to read the encoded expiration configuration, to determine if the media has expired based on the encoded expiration configuration, and to perform the action if the media has expired.

26. An apparatus comprising:

means for encoding an expiration configuration into a non-volatile memory embedded in a media;

means for determining if the media has expired based on the encoded expiration configuration; and means for performing an action if the media has expired.

* * * * *